Sept. 18, 1928.

J. E. HILL 1,684,826

CONDUIT CONNECTER

Filed Jan. 31, 1927

INVENTOR
Joseph E. Hill.
BY
ATTORNEY

Patented Sept. 18, 1928.

1,684,826

UNITED STATES PATENT OFFICE.

JOSEPH E. HILL, OF DETROIT, MICHIGAN.

CONDUIT CONNECTER.

Application filed January 31, 1927. Serial No. 164,792.

The present invention pertains to a device provided for the purpose of joining protected conduits for electrical conducters, but may in fact be used as a coupling in the general way for tubular members such as pipes and the like.

The principal object of the invention is the provision of a connecter of this character associated with either a conduit box or a coupling tube and constructed in such a manner that the conduit will be firmly secured in the device to which it is connected.

In the accomplishment of this object the invention comprises a threaded tubular member containing a partly split sleeve. One end of the sleeve is fitted with a tapered head, and the split permits contraction of the head when pressure is applied thereto. The inner face of the head is formed with circular ribs for engaging the pipe conduit inserted in the sleeve. Over the threaded member is screwed a nut having a conical socket bearing on the tapered head. As the nut is screwed on the threaded member, a wedging action occurs between the wall of the conical socket and the tapered head, whereby the split head is pressed tightly against the pipe and the engagement between the parts is improved by the interior ribs.

The invention is fully disclosed in the following description and in the accompanying drawings, in which Figure 1 is an elevation partly in section, of a device constructed in accordance with the invention;

Reference to these views will now be had by use of like characters which will be employed to designate corresponding parts throughout.

Figure 1:
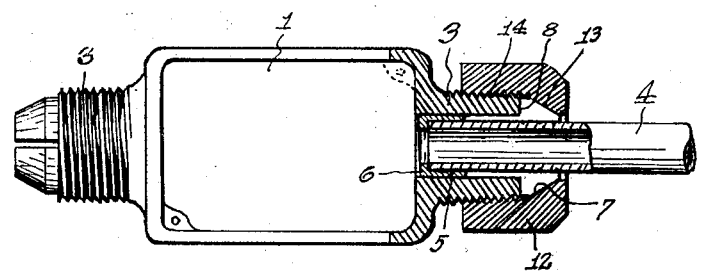

Figure 1 shows a junction or terminal box designated by the numeral 1 and having at each end an exterior threaded nipple 3 adapted to receive a pipe conduit 4 for protecting conductors.

Figure 2:
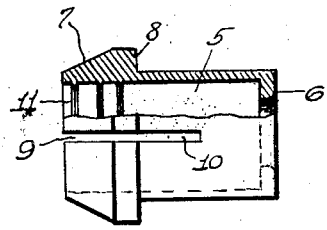
Fig. 2 is an elevation partly in section of the locking sleeve.
Figure 3:
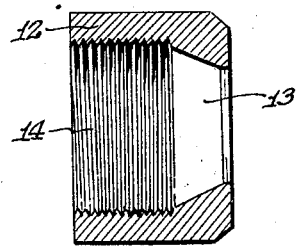
Fig. 3 is a diametrical section of the locking nut.

The external diameter of the pipe 4 is less than the internal diameter of the member 3, and the intervening space is occupied by a locking sleeve 5 of the type shown in Fig. 2. At one end the sleeve has an inner flange 6 which bears against the end of the conduit 4. The other end is formed with a tapered head 7 at the base of which is a shoulder 8 adapted to engage the outer end of the nipple 3 as clearly shown in Fig. 1. A diametrical slot 9 is cut through the head and extends into the sleeve 5 as indicated by the numeral 10. Further, the interior of the head is provided with a series of circular ribs 11 adapted to bear on the pipe 4.

Fitted over the threaded member 3 is a nut 12 having a conical socket 13 communicating with the threaded bore 14 thereof. The wall of the socket engages the tapered head and effects a wedging action therewith, as a result of which the ribs 11, due to the compression permitted by the slot 9, 10, are brought firmly against the conduit 4 as the nut is threaded on the nipple 3.

Figure 4:
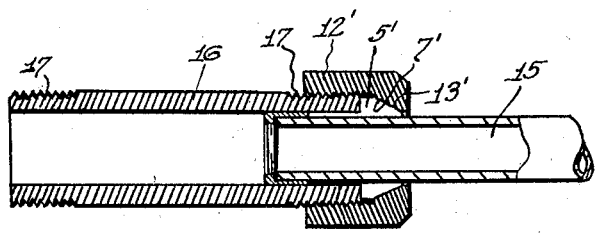
Fig. 4 is a longitudinal sectional view of a modified construction.

A modification of the invention is shown in Fig. 4 which illustrates the locking and clamping device used as part of a coupling for the several conduits. The conduit 15 is inserted at one end of a tube 16 which is threaded exteriorly at both ends as at 17, and the line may be continued by the insertion of a similar conduit at the other end of the tube. Between the outer wall and the tube is placed a sleeve 5′ having a tapered head 7′ similar to the construction described in connection with Fig. 2. A nut 12′ having a conical socket 13′ is fitted over the threaded end 17 in such a manner that the socket 13′ receives the head 7′. The action of the nut on the sleeve is similar to that already pointed out in detail.

Although the specific embodiments of the invention have been illustrated and described, it will be apparent that various alterations and modifications in the details of construction may be made without departing from the scope of the invention as expressed by the appended claims.

What I claim is:—

1. In combination with a hollow threaded member, a sleeve fitted in said member, a tapered head formed on one end of said sleeve and disposed outside said member, a nut threaded on said member and having a conical socket receiving said head, and an inwardly extending stop flange formed at the remaining end of said sleeve.

2. In combination with a hollow threaded member, a sleeve fitted in said member, a tapered head formed on one end of said sleeve and abutting one end of said member exteriorly, a nut threaded on said member and having a conical socket receiving said head, and an inwardly extending stop flange formed at the remaining end of said sleeve.

In testimony whereof I affix my signature.

JOSEPH E. HILL.